UNITED STATES PATENT OFFICE.

CHARLES C. COE, OF HARTFORD, CONNECTICUT.

IMPROVEMENT IN DRYING AND DISINTEGRATING ANIMAL MATTERS.

Specification forming part of Letters Patent No. 141,853, dated August 19, 1873; application filed April 17, 1873.

*To all whom it may concern:*

Be it known that I, CHARLES C. COE, of Hartford, in the county of Hartford and State of Connecticut, have invented an Improved Process for Drying and Disintegrating Animal Matters, of which the following is a specification:

The object of this invention is to provide an improved process for drying animal matters, such as the blood, "tankings," offal, &c., of slaughtering-houses, and producing from them valuable fertilizing materials. I accomplish this by a successive application of the chemical agents named below, reducing the animal matters to dry deodorized powders, containing all the valuable constituents of the original materials in a concentrated form.

To enable others skilled in the art to make use of my invention, I will describe one mode of proceeding, as follows:

I carefully mix with the blood, and other animal matters, which may be either fresh or in a putrefying condition, from five to ten per cent. of their weight of dry quick-lime, unslaked, and put the mixture into any suitable drying-machine, (preferring to use the apparatus patented by A. R. Edwards in 1873,) and partially dry it for about ten minutes. I then add from two to five per cent., more or less, of commercial oil of vitriol, (sulphuric acid,) and thus by chemical action produce a high degree of heat in the mixture; and I continue the drying in the apparatus, in the usual manner, until the whole compound is reduced to a dry easily-pulverized mass, suitable for use as a fertilizer.

The addition of sulphuric acid prevents the further volatilization of ammonia, and the consequent nuisance common to works where such operations are conducted; it increases the drying temperature, absorbs part of the water present, causes almost complete disintegration of the animal tissues, and acts to deodorize the product obtained.

I do not confine myself to the exact proportions of lime and oil of vitrol given in this specification, but have given proportions that will answer the purpose.

I am aware that tank stuff and analogous matter has been treated with unslaked lime alone, and with lime and chloride of sodium or chloride of calcium, in drying-machines. I disclaim the use of these substances as my invention; but I have found that the employment of acids after and with the lime, as hereinbefore set forth, is an improved mode of drying and deodorizing such animal matter, which I desire to secure.

Having thus described my invention, I claim as new and desire to secure by Letters Patent—

The process for drying and disintegrating animal matters herein set forth.

CHARLES C. COE.

Witnesses:
WM. L. BRADLEY,
JOHN D. KEEFE.